(12) United States Patent
Tur

(10) Patent No.: US 8,738,379 B2
(45) Date of Patent: *May 27, 2014

(54) MULTITASK LEARNING FOR SPOKEN LANGUAGE UNDERSTANDING

(75) Inventor: Gokhan Tur, Castro Valley, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1184 days.

This patent is subject to a terminal disclaimer.

(21) Appl. No.: 12/647,901

(22) Filed: Dec. 28, 2009

(65) Prior Publication Data

US 2010/0100380 A1    Apr. 22, 2010

Related U.S. Application Data

(63) Continuation of application No. 11/423,212, filed on Jun. 9, 2006, now Pat. No. 7,664,644.

(51) Int. Cl.
*G10L 15/18* (2013.01)

(52) U.S. Cl.
USPC ........................................................ 704/257

(58) Field of Classification Search
USPC ........................................................ 704/257
See application file for complete search history.

(56) References Cited

U.S. PATENT DOCUMENTS

| | | |
|---|---|---|
| 6,731,609 B1 | 5/2004 | Hirni et al. |
| 6,775,356 B2 | 8/2004 | Salvucci et al. |
| 7,103,068 B1 | 9/2006 | Gardner et al. |
| 7,149,687 B1 | 12/2006 | Gorin et al. |
| 7,263,486 B1 | 8/2007 | Hakkani Tur et al. |
| 7,292,976 B1 | 11/2007 | Hakkani Tur et al. |
| 7,292,982 B1 | 11/2007 | Hakkani-Tur et al. |
| 7,295,981 B1 | 11/2007 | Gupta et al. |
| 7,359,402 B2 | 4/2008 | Gardner et al. |
| 7,412,383 B1 | 8/2008 | Alonso et al. |
| 7,533,019 B1 | 5/2009 | Hakkani-Tur et al. |
| 7,562,014 B1 | 7/2009 | Hakkani-Tur et al. |
| 7,562,017 B1 | 7/2009 | Hakkani-Tur et al. |
| 7,571,098 B1 | 8/2009 | Gorin et al. |
| 7,664,644 B1* | 2/2010 | Tur ............................. 704/257 |
| 8,321,220 B1* | 11/2012 | Chotimongkol et al. ..... 704/257 |
| 2010/0104086 A1* | 4/2010 | Park ......................... 379/265.09 |

* cited by examiner

*Primary Examiner* — Susan McFadden

(57) ABSTRACT

Systems for improving or generating a spoken language understanding system using a multitask learning method for intent or call-type classification. The multitask learning method aims at training tasks in parallel while using a shared representation. A computing device automatically re-uses the existing labeled data from various applications, which are similar but may have different call-types, intents or intent distributions to improve the performance. An automated intent mapping algorithm operates across applications. In one aspect, active learning is employed to selectively sample the data to be re-used.

19 Claims, 4 Drawing Sheets

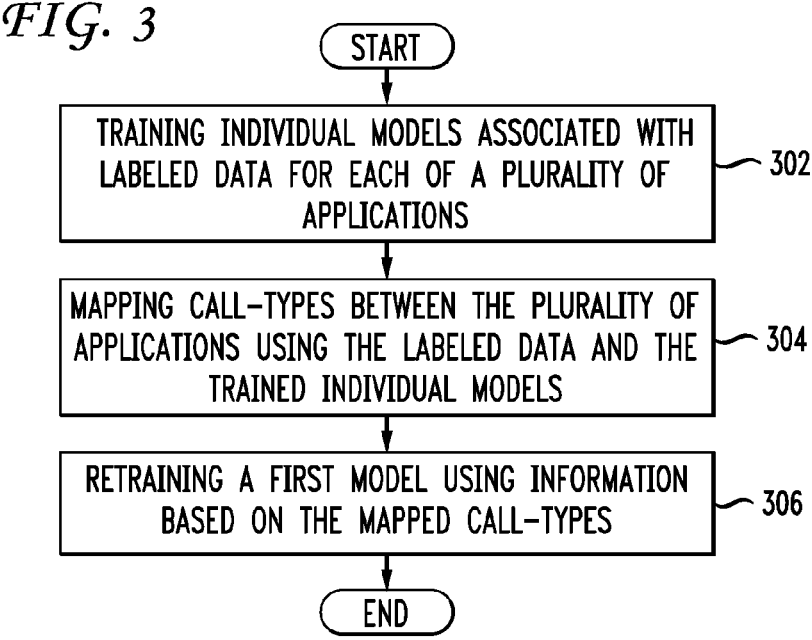
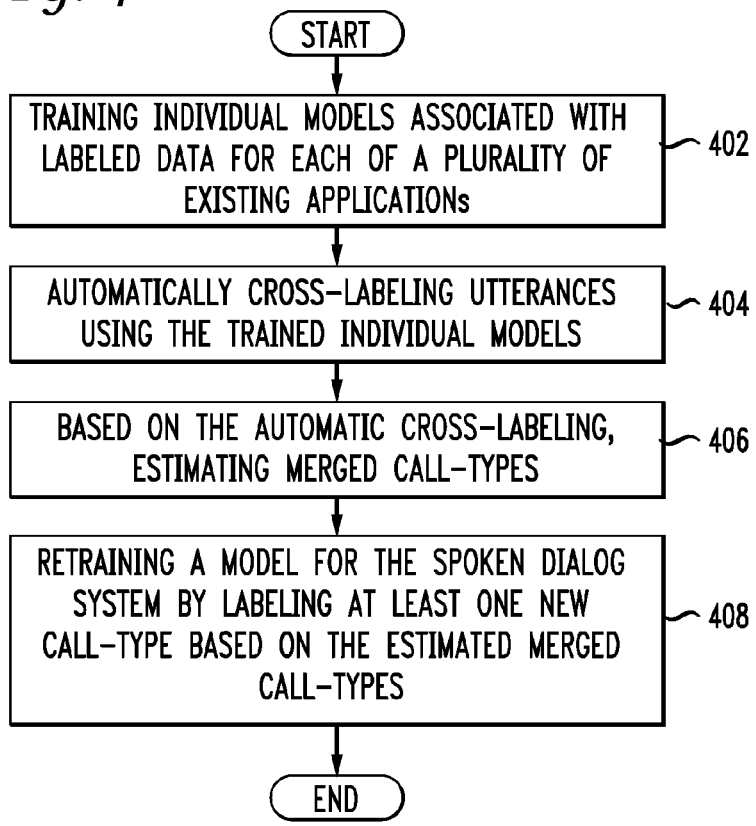

MULTITASK LEARNING FOR SPOKEN LANGUAGE UNDERSTANDING

PRIORITY INFORMATION

The present invention is a continuation of U.S. patent application Ser. No. 11/423,212, filed Jun. 9, 2006, the contents of which is incorporated herein by reference in its entirety.

BACKGROUND OF THE INVENTION

1. Field of the Invention

The present invention relates to a system and method of using multitask learning for improving a spoken dialog system.

2. Introduction

The present invention relates to a spoken dialog system with a particular application to a call routing system where the aim is to route the input calls in a customer care call center. In this spoken dialog system, callers are greeted by the open ended prompt "How May I Help You?" encouraging them to utter their requests in natural language. The system then tries to identify the customer's intent (call-type) using a natural language understanding component. The basic operation of a natural language understanding module within a spoken dialog system is know to those of skill in the art and is discussed more below with reference to FIG. 1. In the event the system is unable to understand the caller with high enough confidence, then the conversation will proceed with either a clarification or a confirmation prompt.

The understanding step and the process of a spoken dialog between a user and a computer system can be seen as a classification problem. For this purpose, data-driven classifiers are trained using large amounts of task data which is usually transcribed and then labeled by humans. This is an expensive and laborious process. The term "labeling" generally means assigning one or more of the predefined intents to each utterance. As an example, consider the utterance "I would like to know my account balance," in a customer care application from a financial domain such as a bank. Assuming that the utterance is recognized correctly, the corresponding intent would be, for example, Request(Balance) and the action would be telling the balance to the user after prompting for the account number or routing this call to the billing department.

In previous work, a model adaptation approach has been used where a better model is built using the adaptation of an existing model of a similar application. See, G. Tur, "Model Adaptation for Spoken Language Understanding", in *Proceedings of the ICASSP*, Philadelphia, Pa., May 2005, incorporated herein by reference. Furthermore, a library-based approach has been discussed where a human expert can bootstrap the new application model by manually selecting data from the library and augmenting them with rules. These approaches are expensive and take a long time to develop and train the models for intent classification. Therefore, what is needed in the art is an improved method of improving a spoken dialog system and generating and implementing intent classification in a natural language dialog system.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Building many spoken dialog systems using similar intent classification models in a shorter time frame motivates us to re-use the existing labeled data from various applications to improve the performance. Disclosed herein are a system, method and computer-readable medium for providing a multitask learning method for intent or call-type classification in a spoken language understanding system. Multitask learning aims at training tasks in parallel while using a shared representation. What is learned for each task can help other tasks be learned better. An aspect of the disclosure relates to automatically re-using the existing labeled data from various applications, which are similar but may have different intents or intent distributions to improve the performance. For this purpose, the method aspect provides for an automated intent mapping algorithm across applications. In one aspect, active learning is employed to selectively sample the data to be re-used. Studies show that significant improvement may be achieved in intent classification performance when the labeled data size is limited.

An example method comprises improving a spoken dialog system using the data and model of a second spoken dialog system by mapping call-types between the spoken dialog system and the second spoken dialog system using labeled data and trained individual model for each spoken dialog system and retraining a first model using information based on the mapped call-types. The mapping may relate to at least one of: splitting call types, merging call types, and renaming call types.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a method embodiment;

FIG. 4 illustrates another method embodiment;

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
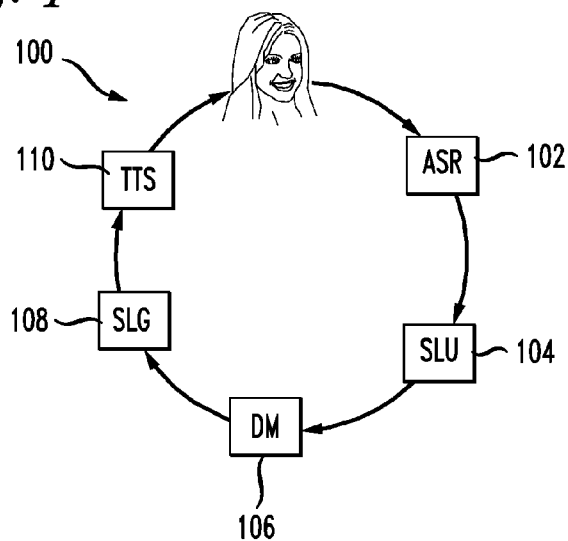
FIG. 1 illustrates the basic components of a spoken dialog system.

Spoken dialog systems aim to identify intents of humans, expressed in natural language, and take actions accordingly, to satisfy their requests. FIG. 1 is a functional block diagram of an exemplary natural language spoken dialog system 100. Natural language spoken dialog system 100 may include an automatic speech recognition (ASR) module 102, a spoken language understanding (SLU) module 104, a dialog management (DM) module 106, a spoken language generation (SLG) module 108, and a text-to-speech (TTS) module 110 (which may relate to any type of module for generating or presented prerecorded speech). While the present invention relates primarily to the SLU module 104, the principles of the invention may expressly be used in any aspect of the spoken dialog system.

ASR module 102 may analyze speech input and may provide a transcription of the speech input as output SLU module 104 may receive the transcribed input and may use a natural language understanding model to analyze the group of words that are included in the transcribed input to derive a meaning from the input. The role of DM module 106 is to interact in a natural way and help the user to achieve the task that the system is designed to support. DM module 106 may receive the meaning of the speech input from SLU module 104 and may determine an action, such as, for example, providing a response, based on the input. SLG module 108 may generate a transcription of one or more words in response to the action provided by DM 106. TTS module 110 may receive the transcription as input and may provide generated audible speech as output based on the transcribed speech.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, may generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having a phone capability) may have an ASR module wherein a user may say "call mom" and the smartphone may act on the instruction without a "spoken dialog."

Figure 2:
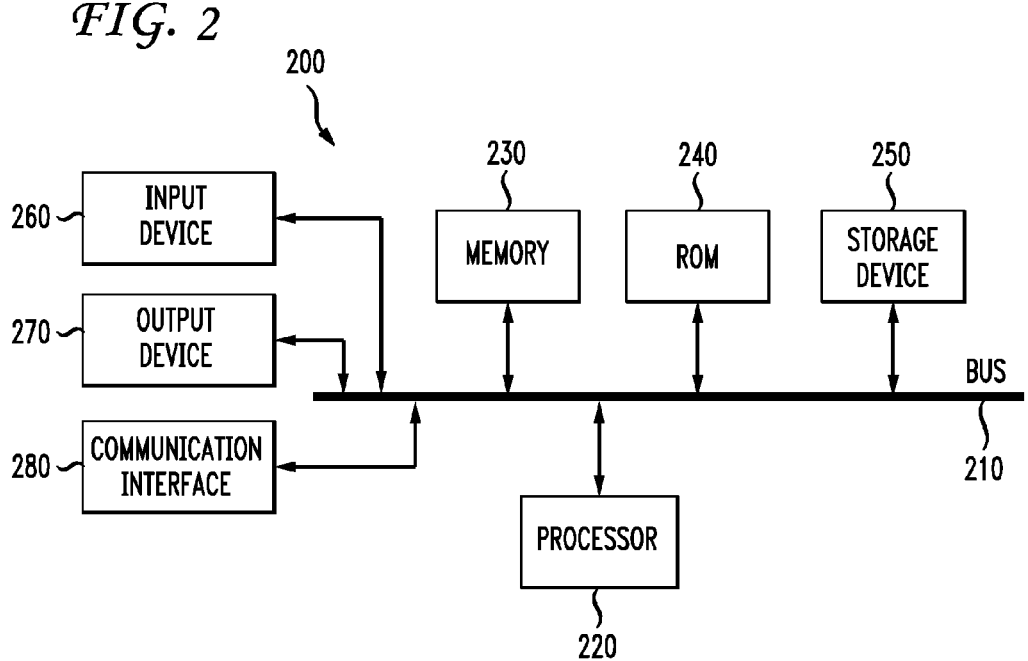
FIG. 2 illustrates a basic system according to an aspect of the invention.

FIG. 2 illustrates an exemplary processing system 200 in which one or more of the modules of system 100 may be implemented. Thus, system 100 may include at least one processing system, such as, for example, exemplary processing system 200. System 200 may include a bus 210, a processor 220, a memory 230, a read only memory (ROM) 240, a storage device 250, an input device 260, an output device 270, and a communication interface 280. Bus 210 may permit communication among the components of system 200. Where the inventions disclosed herein relate to the TTS voice, the output device may include a speaker that generates the audible sound representing the computer-synthesized speech.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to system 200, such as a keyboard, a mouse, a pen, motion input, a voice recognition device, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables system 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of natural spoken dialog system 100, communication interface 280 may not be included in processing system 200 when natural spoken dialog system 100 is implemented completely within a single processing system 200.

System 200 may perform such functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

The disclosure now turns to further details of the invention. A multitask learning method for natural language intent classification is disclosed. Multitask learning aims at training tasks (which may include, for example, applications) in parallel while using a shared representation. See, e.g., for background material, R. Caruana, "Multitask Learning," *Machine Learning*, vol. 218, no. 1, pp. 41-75, 1997, incorporated herein by reference. While typically learning algorithms learn one task at a time, what is learned for each task can help other tasks learn better. Multitask learning has been employed for tasks such as speech and language processing. See, e.g., for background material, S. Parveen and P. Green, "Multitask Learning in Connectionist Robust ASR Using Recurrent Neural Networks," in *Proceedings of the Eurospeech*, Geneva, Switzerland, September 2003, incorporated herein by reference. The Parveen and Green paper employs multitask learning for isolated-word connectionist speech recognition and obtained error reductions. Others have used multitasking in various contexts. The inventors have applied in a novel way the principles of multitasking to the spoken language understanding process which also may be applicable elsewhere.

Multitask learning provides for data amplification to enable the learner to generalize better. The idea involves concatenating the training data of various applications. In order to concatenate the training data, multitask learning requires a shared representation among the tasks, which are going to be learned in parallel. This requires the feature space and the set of classes to be the same. For the tasks, the input is always the same: the current utterance. The problem is the set of classes.

In a spoken dialog system, such as, for example, the AT&T Spoken Language Understanding System, the call-types are designed to capture information that is sufficient to fulfill users' request. The term "call-types" is used herein and may refer specifically to a call type or to a user intent or some other action to be taken or that the user desires the system to take. Accordingly, this is meant to be a generalized term. The call-types may or may not be motivated by the action that needs to be taken and/or the intent of the user.

It is not uncommon that the very same intents have been labeled differently across various applications. One common reason for the mismatched call-type is due to considering different namings or granularities. For example, one application might label the utterance "At what time do you close?" with the call-type Request(Store_Hours) and the utterance "Where exactly is your Manhattan store?" with the call-type Request(Store_Location), and another application might label the very same utterances with the single call-type Request(Store_Info). The call-type Request(Store_Info) may be considered a genus or broader than the more specific Request(Store_Hours) and Request(Store_Location). Although while designing a new application the human designers make effort for consistency with the previous applications, there may be specific design requirements and certain utterances may need to be treated differently. Another reason for call-type mismatch might be due to a given call-type is a subset of more than one call-type.

In the present disclosure, it is assumed that there is some amount of labeled data for two applications. The steps set forth herein and with reference to FIGS. 3 and 4 will provide example steps for processing the labeled data for the two applications to generate a spoken language dialog module, preferably at spoken language understanding module. There may also be more than two applications that have labeled data. As an example first step, a computing device and/or a human researcher will train individual models using corresponding training data sets (302). This general process is known to those of skill in the art. Using the labeled data and models the method involves mapping call-types between the plurality of applications using the labeled data and the trained individual models (304) or finding out the call-type mappings. As can be appreciated, the process here involves a desire to develop a new spoken dialog system. The new system will have a basic model that has been trained at some point based on, for example, data from the first application. The method further involves retraining a first model using information based on the mapped call-types (306).

In another aspect of the disclosure, a method relates to improving a spoken dialog system using the data and model of a second spoken dialog system. This process comprises mapping call-types between the spoken dialog system and the second spoken dialog system using labeled data and trained individual model for each spoken dialog system and retraining a first model using information based on the mapped call-types. The different spoken dialog systems may exist in different domains such as one being in a financial domain and the other in telecommunications. A benefit of this disclosure is that it enables one to exploit data and models from one domain and use them for another. Each task or domain has its own library and so to improve the performance of each application using the data and library of another application, a mapping from one call type to another must occur. A second reason for mapping is that even though one utterance may mean the same thing for two applications, the call types may be designed by humans differently and have different profile labels.

For example, some expert designers may like fine grained call types and others may group call types. One application may have a single call type for route to human. Another application may have route to accounting, route to customer support, route to a supervisor, etc. Therefore, a mapping needs to occur.

The mapping may be one of a number of different types. For example, there may be a 1 to 1 mapping wherein a call type is just renamed. A merging of call types may bring a number of sub-call types into a single call type. Finally, a splitting of all types is the opposite of merging and may split a call type into a number of sub-call types. This mapping may be done automatically or manually.

The inventors have viewed this process as an information (in this case call-type) retrieval problem. The goal is to retrieve the call-types that are merged in the other application. In other words, there will be call types that can merge from one application to another in the sense that they are the same or similar enough to a certain threshold. Several parameters associated with this analysis may be helpful. In the analysis of call-types associated with a first application and call-types associated with a second application, there will be some selected call-types that may or may not be merged and others that are not selected and not merged. A recall is defined as the ratio of call-types that are selected, and the precision is defined as the ratio of call-types that are actually merged.

FIG. 4 illustrates another aspect of the invention. This aspect involves training individual models associated with labeled data for each of a plurality of existing applications (402), automatically cross-labeling utterances using the trained individual models (404), based on the automatic cross-labeling, estimating merged call-types (406) and retraining a model for the spoken dialog system by labeling at least one new call-type based on the estimated merged call-types (408).

First, the system automatically cross-labels the utterances using the existing models. The existing models may be ones recently generated or ones that have existed for some time. An utterance is referred to as $s_i$, to be automatically labeled if a confidence score, $CS(s_i)$, is more than some threshold. In this work, let $$CS(s_i) \approx \max_{c_j} P(c_j | W)$$

where $c_j$ is the call-type and W is the utterance. While the process of selecting all-types and utterances from a first application associated with a first model is involved, several principles are in to be kept in mind. Using the call-types automatically assigned by a model to a second data and actual call-types for the second data, it is possible to estimate the merged call-types. In order to keep the precision high, one aspect of the invention involves requiring that a call-type of the existing model to be labeled as a new call-type by more than a certain ratio. Afterwards or concurrently, split call-types may also be found vice-versa. The last step is re-training the existing model using this information: The call-types which are found to be merged in the new application are also merged in the first data. The call-types which are found to be split in the second application are handled using the automatic labels of the first data. This algorithm can be extended in case there are more than two applications, by trying binary combinations.

The inventors propose an extension of the data amplification method of multitask learning. Active learning aims at reducing the number of training examples to be labeled by selectively sampling a subset of the unlabeled data. This is done by inspecting the unlabeled examples and selecting the most informative ones, with respect to a given cost function, for a human to label. In previous work, the inventors have proposed using active learning for spoken language understanding. The present idea, instead of adding all the data from other applications, one can only add the most informative ones. Based on certainty-based active learning, the inventors use the confidence scores of the utterances, $CS(s_i)$, as the criterion for informativeness, and used the utterances whose confidence scores are lower than some threshold. Although this approach reduces the number of examples added to the training data, it implicitly gives more weight to the examples which are not seen before, hence got a lower score.

The inventors evaluated the proposed methods using the utterances from the database of the AT&T VoiceTone® spoken dialog system. The inventors performed our tests using the Boostexter classification tool, an implementation of the Boosting family of classifiers. Boosting is an iterative procedure; on each iteration a weak classifier is trained on a weighted training set, and at the end, the weak classifiers are combined into a single, combined classifier. For all experiments, the inventors used word trigrams as features, and a weak classifier (e.g. "decision stump") can check the absence or presence of a feature.

For experimentations, the inventors used two applications from the telecommunications domain and checked whether automatically selecting utterances with mapped call-types from one application would help the other one. As can be appreciated, any two applications may be used and they do not need to be in the same "domain" or subject matter. The data characteristics for the two applications used in the experiments are given in Table 1 below. In the experiments all of the utterances are transcribed in order not to deal with ASR errors.

While evaluating the classification performance, the inventors used the top class error rate (TCER) metric, which is the fraction of utterances in which the call-type with maximum probability was not one of the true call-types. In order not to deal with finding the optimal iteration numbers in Boosting, the inventors iterated many times, got the error rate after each iteration, and used the best error rate in all the results below.

TABLE 1

|  | $T_1$ | $T_2$ |
|---|---|---|
| Training Data Size | 35,551 utt. | 9,093 utt. |
| Test Data Size | 5,000 utt. | 5,172 utt. |
| Number of Calltypes | 65 | 84 |
| Call-type Perplexity | 14.7 | 29.3 |
| Average Utterance Length | 12 words | 13 words |

Figure 5A:
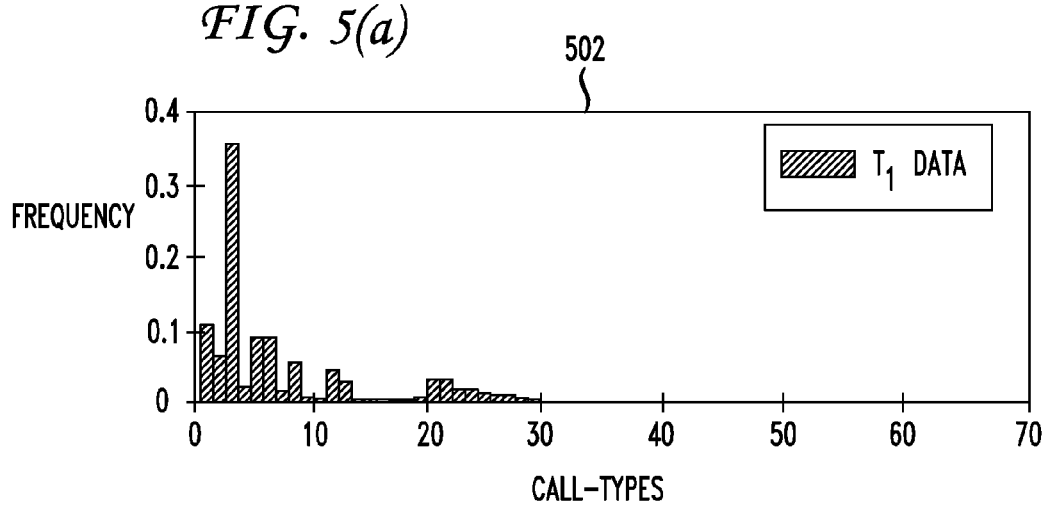
FIG. 5 illustrates data associated with call-type frequencies.
Figure 5B:
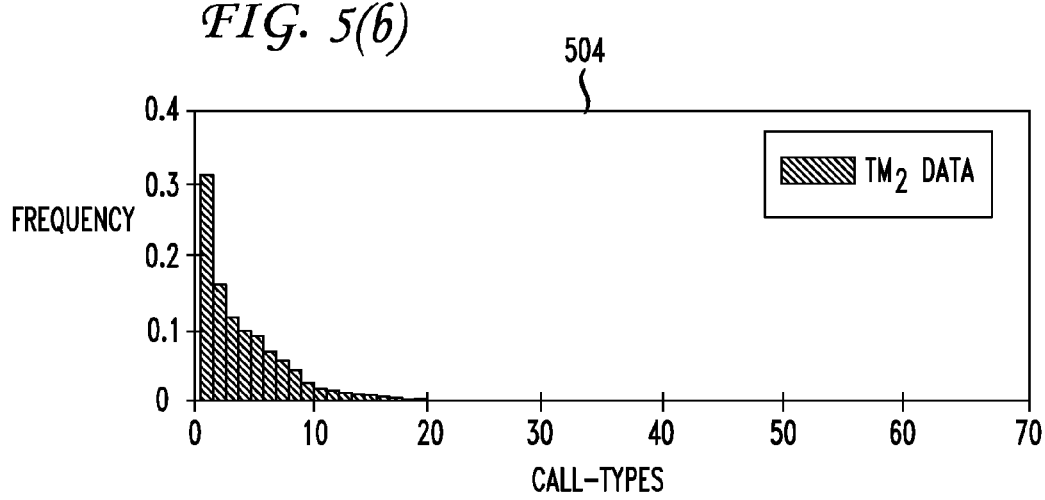

Before reusing data from the application $T_2$, one needs to map the call-types into the other application. Using the method explained above, the inventors have come up with 19 mappings. Of course each new application will have different numbers and sets of mappings. Some frequent examples include:
Make(Payment)→Pay-Bill
Request(Sales)→New-Service
Tell me(Balance)→Account-Balance
Verify(Payment)→Account-Balance Note that the last two ones indicate two merged call-types. After these mappings, the inventors filtered out the utterances of $T_2$ whose call-types are unknown to Application $T_1$. This left us with about half of the all data, more specifically in this particular experiment, with 4,666 utterances. The call-type frequencies of $T_1$ and mapped utterances of $T_2(MT_2)$ are given in FIG. 5 in graphs 502 and 504. As seen, the most frequent call-types of $T_1$ also exist in the $MT_2$ data, in total only 11.5 of the utterances of $T_1$ has a call-type which is not seen in $MT_2$.

Figure 6:
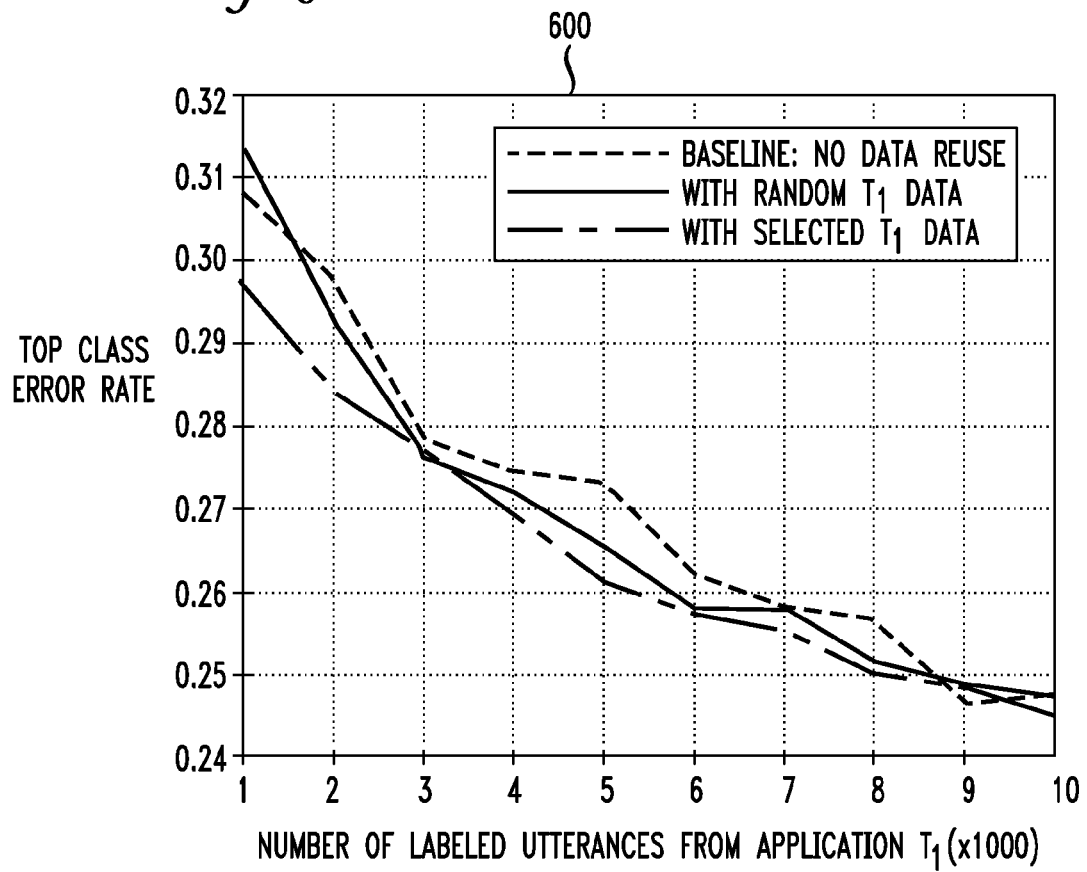
FIG. 6 illustrates results using multitask learning.

When the inventors use the same 4,666 utterances as the sole training data, the results is a TCER of 31.84% on the $T_1$ test set. Note that this figure is only 4.6% inferior than 27.26%, the performance obtained when using a random subset of the same size from $T_1$ training data. After getting these promising results, the inventors tested these 4,666 utterances with the $T_1$ model and selected 897 utterances, which have low confidences, as explained above. Call-type frequencies for the $T_1$ data and the mapped $T_2$ ($MT_2$) data are shown in FIG. 6. This figure shows the learning curve 600 by adding these 897 utterances to the training data of the $T_1$. The top most curve is the baseline and obtained without any data re-use. In order to check the effect of using selected data, the inventors have randomly selected 897 utterances among 4,666 utterances, then added these to the $T_1$ training data. This is the curve lying below the baseline. As seen, multitask learning helped at all data points, until $T_1$ has about 9,000 labeled training utterances. Note that this is about 10 times the amount of data re-used. Furthermore, for the first 2 data points, improvement is shown. FIG. 6 also proves the effectiveness of the selective sampling of data to be re-used for multitask learning. At almost all data points, active multitask learning outperformed random multitask learning.

Disclosed herein is an application of multitask learning for natural language intent classification. It has been shown that, for this task, using the proposed methods, it is possible to improve the performance of a spoken language understanding system and perhaps other spoken language modules significantly when there is not much training data available. A concept also proposed is to combine multitask learning with active learning to selectively sample the data to re-use.

Multitask learning is also applicable to many other speech and language processing tasks. For example, the well-known ATIS SLU task requires the system to determine the departure and arrival cities in the utterances. See P. J. Price, "Evaluation of Spoken Language Systems: The ATIS Domain," in *Proceedings of the DARPA Workshop on Speech and Natural Language*, Hidden Valley, Pa., June 1990, incorporated herein by reference. One can use a named entity extraction task training data to determine the locations to improve the performance of these two sub-named entities in ATIS, and vice versa. This corresponds to merged classes in our case.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

I claim:

1. A system comprising:
a processor; and
a computer-readable storage medium having instructions stored which, when executed by the processor, cause the processor to perform operations comprising:
training individual models associated with labeled data for each of a plurality of applications, to yield trained individual models;
mapping call-types between the plurality of applications using the labeled data and the trained individual models, to yield mapped call-types; and
retraining a first model based on the mapped call-types.

2. The system of claim 1, the computer-readable storage medium having additional instructions stored which result in the operations further comprising automatically cross labeling utterances from each of the plurality of applications using the trained individual models.

3. The system of claim 2, wherein the utterances that are automatically cross-labeled have a confidence score above a threshold.

4. The system of claim 3, wherein the confidence score is based on one of a call type and an utterance.

5. The system of claim 1, the computer-readable storage medium having additional instructions stored which result in the operations further comprising:
estimating merged call-types based on the mapped call-types between the plurality of applications; and
identifying split call-types.

6. The system of claim 1, the computer-readable storage medium having additional instructions stored which result in the operations further comprising labeling, as a new call-type, a call-type of the first model by more than a certain ratio.

7. The system of claim 6, wherein the retraining of the first model further comprises using call-types which are merged in a new application and which are also merged into the first data.

8. The system of claim 1, wherein the retraining utilizes active learning to selectively sample data for re-use when retraining.

9. The system of claim 8, wherein the active learning selects utterances from a set of utterances generated based on the mapped call-types between the plurality of applications.

10. The system of claim 9, wherein utterances selected by active learning are added to training data used to retrain the first model.

11. A system comprising:
a processor; and
a computer-readable storage medium having instructions stored which, when executed by the processor, cause the processor to perform operations comprising:
performing automatic cross-labeling of utterances using trained individual models associated with labeled data for each of a plurality of existing applications;
estimating merged call-types based on the automatic cross-labeling, to yield estimated merged call-types; and
retraining a model for a spoken dialog system by labeling a new call-type based on the estimated merged call-types.

12. The system of claim 11, the computer-readable storage medium having additional instructions stored which result in the operations further comprising retraining a model associated with another of the plurality of existing applications based on the estimated merged call-types.

13. A system comprising:
a processor; and
a computer-readable storage medium having instructions stored which, when executed by the processor, cause the processor to perform operations comprising:
performing automatic cross-labeling of utterances using trained individual models associated with labeled data for each of a plurality of existing applications;
estimating merged call-types based on the automatic cross-labeling, to yield estimated merged call-types; and
retraining a respective model associated with each of the plurality of existing applications based on the estimated merged call-types.

14. The system of claim 13, the computer-readable storage medium having additional instructions stored which result in the operations further comprising applying active multitask active learning to select re-use data for use in the step of retraining a respective model.

15. The system of claim 14, wherein the re-use data is existing labeled data.

16. The system of claim 13, wherein the plurality of existing applications comprises a first application and a second application, the computer-readable storage medium having additional instructions stored which result in the operations further comprising filtering out utterances of the second application that are unknown to the first application and apply active multitask learning to select utterances from the second application after estimating merged call-types.

17. The system of claim 16, the computer-readable storage medium having additional instructions stored which result in the operations further comprising:
applying active multitask active learning to select re-use data from a set of utterances obtained by the filtering; and
adding the re-use data to retraining data used for training the first application.

18. A system comprising:
a processor; and
a computer-readable storage medium having instructions stored which, when executed by the processor, cause the processor to perform operations comprising:
mapping call-types between a first spoken dialog system and a second spoken dialog system using labeled data and trained individual models for each spoken dialog system, to yield mapped call-types; and
retraining a first model using information based on the mapped call-types.

19. The system of claim 18, wherein the mapping uses one of: splitting call types, merging call types, and renaming call types.

* * * * *